United States Patent
Ryu

(10) Patent No.: US 10,468,643 B2
(45) Date of Patent: Nov. 5, 2019

(54) BATTERY MODULE AND BATTERY PACK INCLUDING THE SAME

(71) Applicant: LG CHEM, LTD., Seoul (KR)

(72) Inventor: Jae-Uk Ryu, Daejeon (KR)

(73) Assignee: LG CHEM, LTD., Seoul (KR)

( * ) Notice: Subject to any disclaimer, the term of this patent is extended or adjusted under 35 U.S.C. 154(b) by 204 days.

(21) Appl. No.: 15/692,462

(22) Filed: Aug. 31, 2017

(65) Prior Publication Data

US 2018/0069215 A1 Mar. 8, 2018

(30) Foreign Application Priority Data

Sep. 5, 2016 (KR) .................. 10-2016-0113899

(51) Int. Cl.
*H01M 2/10* (2006.01)
*H01M 10/04* (2006.01)
*B60K 1/04* (2019.01)

(52) U.S. Cl.
CPC ..... *H01M 2/1077* (2013.01); *H01M 10/0486* (2013.01); *B60K 2001/0438* (2013.01); *H01M 2220/20* (2013.01)

(58) Field of Classification Search
CPC .................. H01M 2/1077; H01M 2/1016
See application file for complete search history.

(56) References Cited

U.S. PATENT DOCUMENTS

| | | | | |
|---|---|---|---|---|
| 6,403,251 B1 * | 6/2002 | Baggaley | ............ | H01M 2/1016 320/127 |
| 9,196,880 B2 | 11/2015 | Kim | | |
| 2004/0016455 A1 * | 1/2004 | Oogami | ............ | H01M 2/02 136/244 |
| 2005/0089751 A1 * | 4/2005 | Oogami | ............ | H01M 2/1061 429/162 |
| 2005/0100783 A1 * | 5/2005 | Ro | ............ | H01M 2/1061 429/159 |
| 2005/0221177 A1 * | 10/2005 | Amagai | ............ | H01M 2/20 429/186 |
| 2006/0159988 A1 * | 7/2006 | Kang | ............ | H01M 2/0207 429/156 |
| 2007/0124980 A1 * | 6/2007 | Yang | ............ | H01M 2/1077 42/75.03 |
| 2010/0151313 A1 * | 6/2010 | Kosugi | ............ | H01M 2/1016 429/158 |
| 2010/0187027 A1 * | 7/2010 | Komaki | ............ | H01M 2/1077 180/65.21 |
| 2012/0055725 A1 | 3/2012 | Mizoguchi et al. | | |
| 2013/0252052 A1 * | 9/2013 | Dawley | ............ | H01M 2/206 429/93 |
| 2014/0220390 A1 | 8/2014 | Park et al. | | |

(Continued)

FOREIGN PATENT DOCUMENTS

KR 10-2012-0015446 A 2/2012
KR 10-2012-0086656 A 8/2012

(Continued)

*Primary Examiner* — Matthew J Merkling
(74) *Attorney, Agent, or Firm* — Morgan, Lewis & Bockius LLP

(57) ABSTRACT

Disclosed are a battery module and a battery pack including the same. The battery module includes a frame; and a plurality of battery cells disposed at the frame, and the plurality of battery cells are arranged in a single layer with respect to the frame.

8 Claims, 4 Drawing Sheets

(56) References Cited

U.S. PATENT DOCUMENTS

| | | |
|---|---|---|
| 2015/0064505 A1 | 3/2015 | Lee |
| 2015/0079447 A1 | 3/2015 | Park et al. |
| 2015/0140362 A1* | 5/2015 | Lee .................... H01M 2/0267 |
| | | 429/7 |
| 2015/0162581 A1* | 6/2015 | Chan ................... H01M 10/615 |
| | | 429/99 |
| 2016/0233465 A1 | 8/2016 | Lee et al. |

FOREIGN PATENT DOCUMENTS

| | | |
|---|---|---|
| KR | 10-2014-0100291 A | 8/2014 |
| KR | 10-2015-0026111 A | 3/2015 |
| KR | 10-2015-0031864 A | 3/2015 |
| KR | 10-2016-0016550 A | 2/2016 |

* cited by examiner

BATTERY MODULE AND BATTERY PACK INCLUDING THE SAME

TECHNICAL FIELD

The present application claims priority to Korean Patent Application No. 10-2016-0113899 filed on Sep. 5, 2016 in the Republic of Korea, the disclosures of which are incorporated herein by reference.

The present disclosure relates to a battery module and a battery pack including the same, and more particularly, to a battery module easily applicable to an under floor of an electric vehicle or the like by reducing the overall height of the battery module, and a battery pack including the same.

BACKGROUND ART

As technology development and demand for a mobile device have increased, demand for a secondary battery as an energy source has rapidly increased. Conventionally, a nickel-cadmium battery or a hydrogen ion battery has been used as the secondary battery. However, a lithium secondary battery is recently widely used because charging and discharging is free due to rare memory effect in comparison with a nickel-based secondary battery, a self-discharge rate is very low, and an energy density is high.

The lithium secondary battery mainly uses a lithium oxide and a carbonaceous material as a positive electrode active material and a negative electrode active material, respectively. The lithium secondary battery includes an electrode assembly in which a positive electrode plate and a negative electrode plate, respectively coated with the positive electrode active material and the negative electrode active material, are arranged with a separator therebetween, and an outer member, that is a battery case, which seals and receives the electrode assembly together with an electrolyte solution.

The lithium secondary battery includes a positive electrode, a negative electrode, and a separator and an electrolyte interposed therebetween. Depending on which material is used for the positive electrode active material and the negative electrode active material, the lithium secondary battery is classified into a lithium ion battery (LIB) and a polymer lithium ion battery (PLIB). Generally, an electrode of the lithium secondary battery may be prepared by applying the positive or negative electrode active material to a current collector made of aluminum or copper sheet, mesh, film, foil, or the like and then drying the same.

FIG. 1 is a perspective view showing a conventional battery module in which battery cells are stacked, and FIG. 2 is a cross-sectional view, taken along the line A-A' of FIG. 1. Referring to FIGS. 1 and 2, a conventional battery module 1 in which battery cells 3 are stacked is configured so that a plurality of battery cells 3 are stacked on each other and accommodated in a case 2. Thus, the battery module 1 has an increased height H, and thus it is difficult to dispose the battery module 1 at an under floor of an electric vehicle or the like.

RELATED LITERATURES

Patent Literature

Korean Unexamined Patent Publication No. 10-2015-0031864 (published on Mar. 25, 2015)

DISCLOSURE

Technical Problem

Therefore, the present disclosure is directed to providing a battery module, which may be easily disposed at an under floor of an electric vehicle or the like since the overall height of the battery module is reduced in comparison to a conventional battery module, and a battery pack including the same.

In addition, the number of components required for manufacturing the battery module may be reduced, thereby providing a battery module with reduced costs and a battery pack including the battery module.

Moreover, it is possible to provide a battery module and a battery pack including the same, which may ensure the improved overall stability since a control unit may be protected even when an external force is generated.

Technical Solution

In one aspect of the present disclosure, there is provided a battery module, comprising: a frame; and a plurality of battery cells disposed at the frame, wherein the plurality of battery cells are arranged in a single layer with respect to the frame.

Also, the plurality of battery cells may be arranged in at least one row or in at least one column.

In addition, the frame may include: an outer frame member forming an appearance thereof; and an inner frame member disposed in an empty space of the outer frame member with a predetermined interval.

Also, the frame may be made of a conductive material.

In addition, the battery cells may be respectively electrically coupled to the outer frame member and the inner frame member or respectively electrically coupled to a plurality of inner frame members.

Also, the battery module may further comprise a control unit disposed at a center portion of the frame and connected to the plurality of battery cells.

In addition, the frame may further include a space partition guide formed at the frame to distinguish a space in which the plurality of battery cells are disposed.

Also, a seating groove may be formed at the frame so that electrode leads of the battery cells are coupled thereto.

Meanwhile, in another aspect of the present disclosure, there is also provided a battery pack, comprising the battery module as described above, and also provided a vehicle, comprising the battery module as described above.

Advantageous Effects

According to the embodiments of the present disclosure, since a plurality of battery cells are arranged in a single layer with respect to a frame, the overall height of the battery module is reduced in comparison to a conventional battery module, and thus the battery module may be easily disposed at an under floor of an electric vehicle or the like.

Also, since the frame is made of a conductive material to serve as a bus bar, it is not necessary to provide a bus bar separately, and thus the number of components required for manufacturing the battery module may be reduced, thereby reducing the cost.

In addition, a control unit may be disposed at a center portion of the frame, and thus it is possible to prevent an external force from being directly transmitted to the control unit, thereby protecting the control unit and thus improving stability.

BEST MODE

Figure 1:
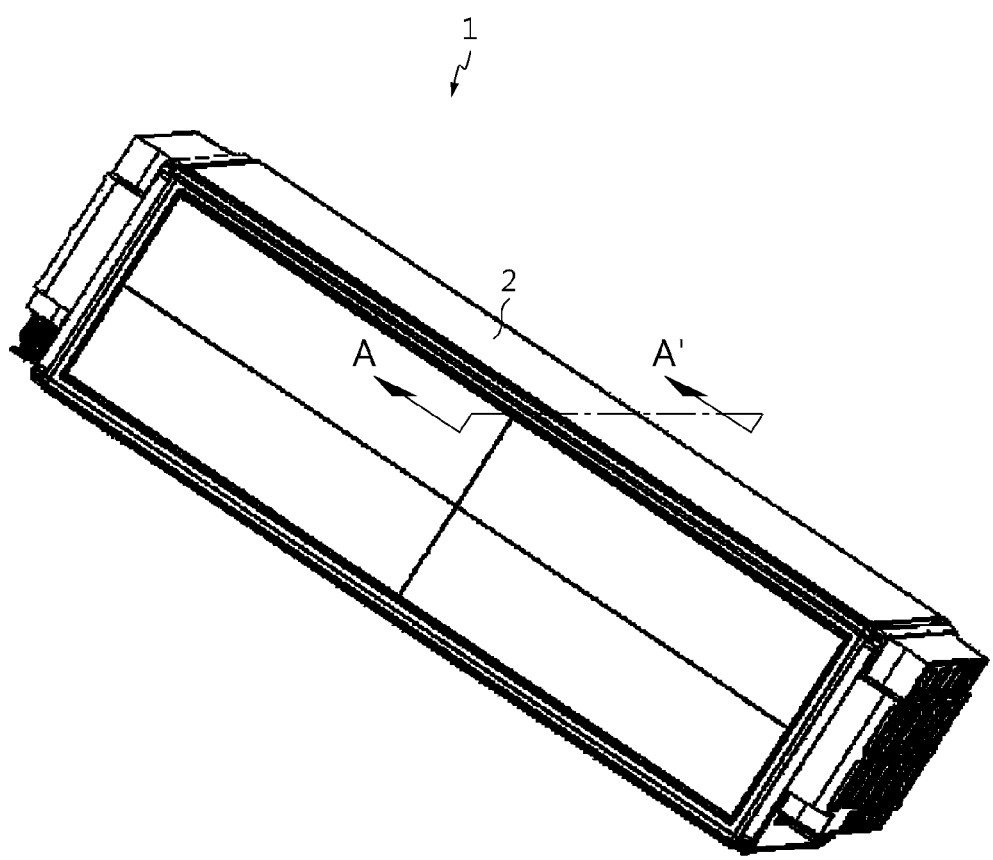
FIG. 1 is a perspective view showing a conventional battery module in which battery cells are stacked.
Figure 2:
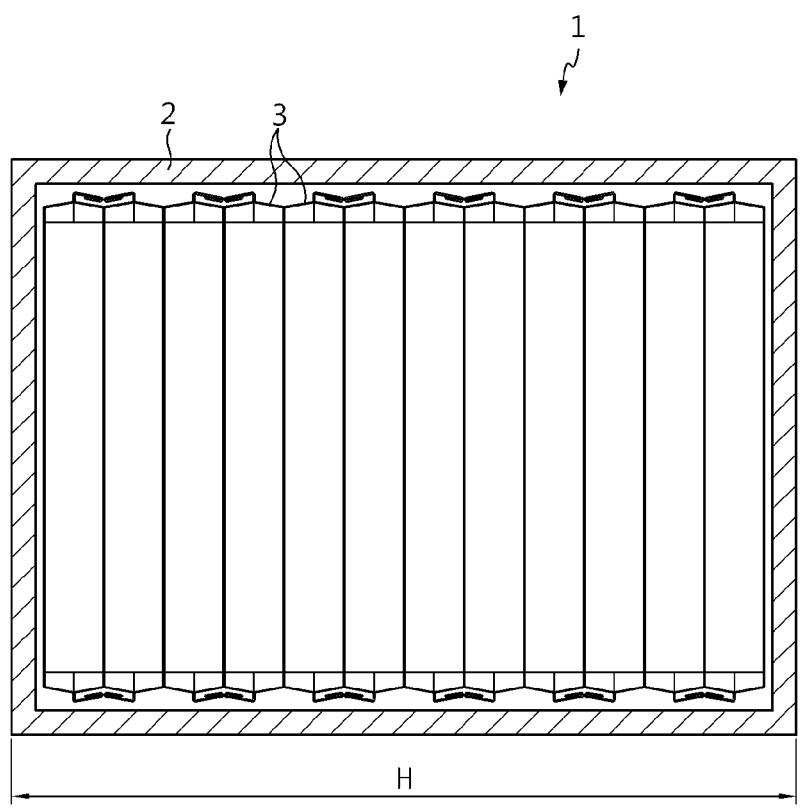
FIG. 2 is a cross-sectional view, taken along the line A-A' of FIG. 1.

Hereinafter, a battery module according to an embodiment of the present disclosure and a battery pack including the same will be described in detail with reference to the accompanying drawings.

It should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

In the drawings, the size of each element or a specific part of the element may be exaggerated, omitted, or schematically illustrated for convenience and clarity of a description. Thus, the size of each element does not entirely reflect the actual size of the element. A detailed description of well-known functions or elements associated with the present disclosure will be omitted if it unnecessarily obscures the subject matter of the present disclosure.

The term, 'combine' or 'connect' as used herein, may refer not only to a case where one member and another member are directly combined or directly connected but also a case where one member is indirectly combined with another member via a connecting member or is indirectly connected.

A battery module according to an embodiment of the present disclosure may be applied to various machines or devices using electricity. For convenience, the following explanation is based on a case where the battery module is disposed at an electric vehicle, particularly at an under floor of the electric vehicle. Here, the electric vehicle may include not only an electric vehicle driven purely by electricity but also a hybrid vehicle capable of using electric energy and another energy together.

Figure 3:
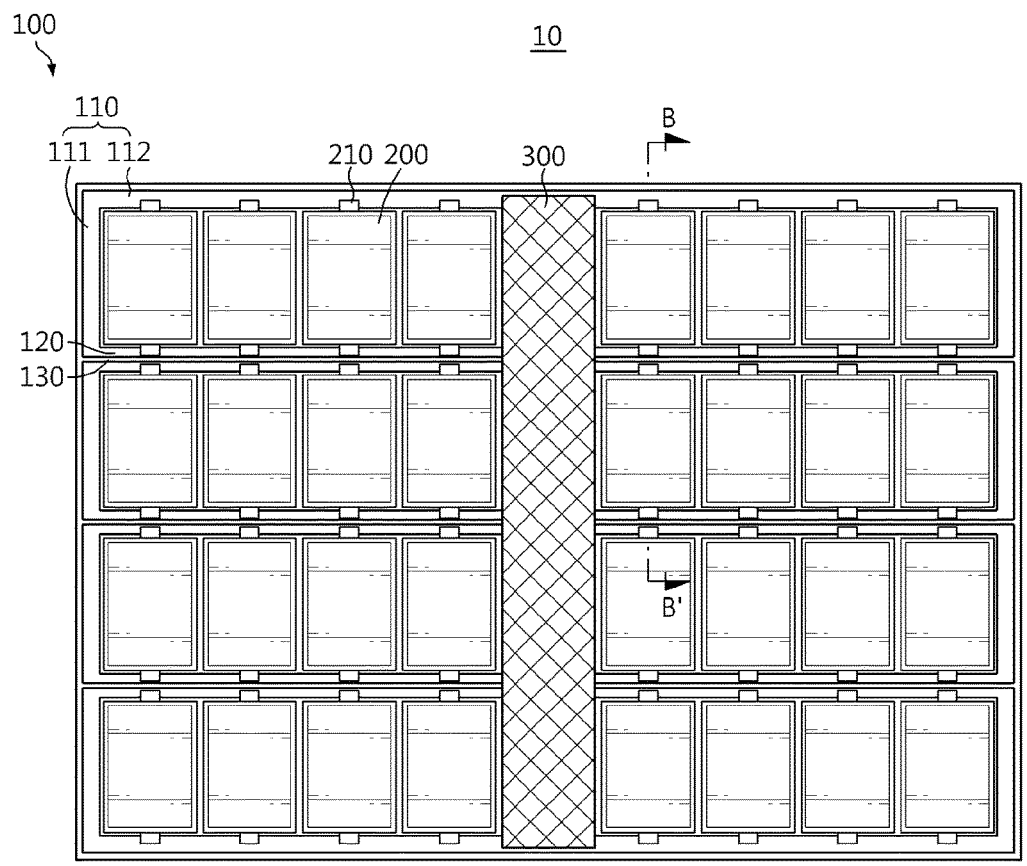
FIG. 3 is a schematic plane view showing a battery module according to the first embodiment of the present disclosure.
Figure 4:
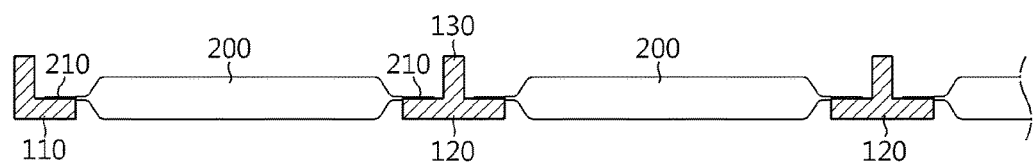
FIG. 4 is a cross-sectional view, taken along the line B-B' of FIG. 3.

FIG. 3 is a schematic plane view showing a battery module according to the first embodiment of the present disclosure, and FIG. 4 is a cross-sectional view, taken along the line B-B' of FIG. 3.

Referring to FIG. 3, a battery module 10 according to the first embodiment of the present disclosure includes a frame 100 and a plurality of battery cells 200, and the plurality of the battery cells 200 are arranged in a single layer with respect to the frame 100.

The frame 100 may be formed in an approximately square or rectangular shape so as to provide an empty space, but without being limited thereto, it would be fully understood by those skilled in the art that the frame 100 may also be modified into a circular shape, an elliptical shape, a rhombic shape, a triangular shape, or the like, without departing from the scope of the present disclosure. If the frame 100 is formed in a rectangular shape, the length and width of the frame 100 may be changed according to the size of an installation place or a use place, for example the size of an under floor of an electric vehicle.

The frame 100 may include an outer frame member 110 and an inner frame member 120. The outer frame member 110 forms an outer appearance of the frame 100 and may have two short-side frame members 111 and two long-side frame members 112. The corners of the short-side frame members 111 and the long-side frame members 112 may be coupled by means of welding or the like, or may be integrally formed. The inner frame member 120 may be disposed in an empty space of the outer frame members 110 with a predetermined interval. The inner frame member 120 may be welded to the outer frame member 110 by means of welding or the like, or the inner frame member 120 and the outer frame member 110 may be integrally formed. At least one inner frame member 120 may be provided, and if the plurality of battery cells 200 are arranged in one row or in one column, the frame 100 may be formed only with the outer frame member 110, without the inner frame member 120.

The frame 100 may be made of a conductive material such as iron (Fe), copper (Cu), aluminum (Al), silver (Ag), or zinc (Zn) or the like in a flat form to serve as a bus bar. The material of the frame 100 is not limited to iron, copper, aluminum, silver and zinc, mentioned above, but may include various other materials as long as they have predetermined rigidity and good electricity. The bus bar may be used to electrically connect two or more secondary batteries in a common battery module. In other words, the bus bar electrically connects the plurality of battery cells, and the plurality of battery cells may be connected in series or in parallel to configure a battery module. Here, in the case of a common battery module, additional components are required to manufacture a bus bar for electrically connecting the plurality of battery cells. However, according to the first embodiment of the present disclosure, the frame 100 of the battery module 10 may be made of a conductive material, and if the battery cells 200 are electrically connected to the frame 100, the frame 100 serves as a bus bar. Thus, separate components for manufacturing the bus bar are not necessary, and the number of components is reduced, thereby reducing the cost.

The plurality of battery cells 200 may be arranged to form a single layer with respect to the frame 100 and coupled to the frame 100. In other words, if the plurality of battery cells 200 are stacked on each other as in the existing technique, the height of the battery module 10 is increased. However, in the battery module 10 according to the first embodiment of the present disclosure, the plurality of the battery cells 200 are arranged in rows and in columns to have a single layer as shown in FIG. 3, and thus the overall height of the battery module 10 may be decreased in comparison to the conventional battery module in which battery cells are stacked. Thus, the battery module 10 may be easily arranged in a space with a limited height such as an under floor of an electric vehicle or the like. In addition, if the plurality of battery cells 200 are arranged to have one layer at the frame 100, a case (not shown) may be provided to surround the battery cells 200 and the frame 100. Meanwhile, a plurality of battery modules 10 according to the first embodiment of the present disclosure may be provided to be stacked, which however is different from the case where a plurality of battery cells 200 are stacked in a single battery module 10.

The plurality of battery cells 200 may be arranged in a matrix fashion while forming a single layer with respect to the frame 100 and may have at least one row or at least one column. In FIG. 3, the plurality of battery cells 200 are arranged in four rows and 8 columns, but this is just an example, and the plurality of battery cells 200 may be arranged in variable matrix fashions. In other words, the plurality of battery cells 200 may be arranged to have a plurality of columns with respect to one row, or the plurality of battery cells 200 may be arranged to have one column with respect to a plurality of rows, or the plurality of battery cells 200 may be arranged to have a plurality of columns with respect to a plurality of rows. In addition, if the plurality of battery cells 200 are arranged at the frame 100 in various ways, each electrode lead 210 of the plurality of battery cells 200 may be coupled to the frame 100 by means of various welding fashions. The battery cells 200 may be electrically coupled to the outer frame member 110 and the inner frame member 120, respectively. In other words, since the frame 100 may be made of a conductive material as described above, if the electrode lead 210 of the battery cell 200 is coupled to the outer frame member 110 and the inner frame member 120 by, for example, welding, the battery cell 200 and the frame 100 may be electrically coupled. Similarly, if the electrode lead 210 of the battery cell 200 is coupled to the plurality of inner frame members 120, for example any one inner frame member 120 and a neighboring inner frame member 120, by welding, the battery cell 200 and the frame 100 may be electrically coupled. In addition, the frame 100 may be coupled to a control unit 300 including a battery management system (BMS) capable of providing data on the voltage or temperature of the battery cell 200, and thus the battery cell 200 may be electrically connected to the control unit 300 through the frame 100, and thus the frame 100 may serve as a bus bar.

The control unit 300 is connected to the battery cell 200 through the frame 100 and may control electrical connection/disconnection, charging/discharging and the like of the battery cell 200. Referring to FIG. 3, the control unit 300 may be disposed at a center portion of the frame 100 and coupled to the frame 100, and may be connected to the plurality of battery cells 200 through the frame 100. If the control unit 300 is disposed at the center portion of the frame 100 as above, when the battery module 10 is installed at an under floor of an electric vehicle, even though an external force is applied to the electric vehicle due to running or collision during traveling, it is prevented that the external force is directly transmitted to the control unit 300. Thus, the stability of the battery module 10 may be improved.

The space partition guide 130 may be formed at the frame 100 to distinguish a space in which the plurality of battery cells 200 may be disposed. Referring to FIG. 4, the space partition guide 130 is formed to protrude from the outer frame member 110 and the inner frame member 120, for example in an upward direction, and by doing so, it is possible to prevent the electrode lead 210 of one battery cell 200 and the electrode lead 210 of another battery cell 200 adjacent thereto from being in direct contact. However, the space frame guide 130 may or may not be formed at the outer frame member 110.

Hereinafter, the configuration and effects of the battery module 10 according to the first embodiment of the present disclosure will be described.

Referring to FIG. 3, the plurality of battery cells 200 may be arranged in rows and in columns to have a single layer with respect to the frame 100, which may be made of a conductive material, and the plurality of battery cells 200 may be electrically coupled to the frame 100 through the electrode lead 210, respectively. By arranging the plurality of battery cells 200 to have a single layer as described above, the overall height of the battery module 10 according to the first embodiment of the present disclosure is reduced in comparison to a conventional battery module, and thus the battery module 10 may be easily disposed at an under floor of an electric vehicle or the like. In addition, since the frame 100 serves as a bus bar, the number of components required for making a separate bus bar is reduced, thereby reducing the cost.

Meanwhile, since the control unit 300 is disposed at the center portion of the frame 100 to be coupled to the frame 100 and is connected to the plurality of battery cells 200 through the frame 100, it is prevented that an external force from being directly transmitted to the control unit 300, thereby protecting the control unit 300. Thus, the stability of the battery module 10 may be improved.

Figure 5:
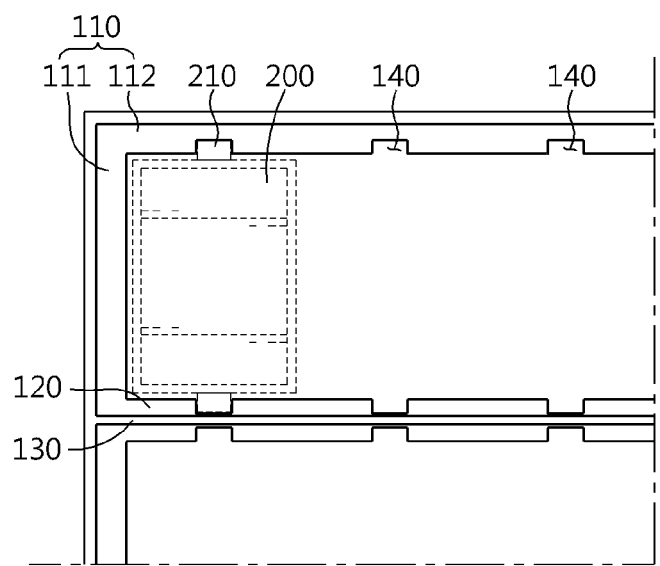
FIG. 5 is a schematic view showing a part of a battery module according to the second embodiment of the present disclosure.

FIG. 5 is a schematic view showing a part of a battery module according to the second embodiment of the present disclosure.

Hereinafter, the operation and effect of a battery module 10 according to the second embodiment of the present disclosure according to the present disclosure will be described with reference to the accompanying drawings, in which any feature identical to that of the battery module 10 according to the first embodiment of the present disclosure will not be described in detail here.

The second embodiment of the present disclosure is different from the first embodiment in that a seating groove 140 is formed at the frame 100 so that the electrode lead 210 of the battery cell 200 may be coupled thereto.

The seating groove 140 may be formed at the outer frame member 110 or the inner frame member 120 so that the electrode lead 210 of the battery cell 200 may be easily coupled to the frame 100. The seating groove 140 may be formed in various ways at various portions of the frame 100. For example, the seating groove 140 may be formed by cutting with a cutting device (not shown) equipped with a laser, or the seating groove 140 is formed when the frame is molded. If the seating groove 140 is formed at the frame 100, the plurality of battery cells 200 are coupled to the frame 100 at correct positions, thereby ensuring stable electrical connection.

Meanwhile, a battery pack (not shown) according to an embodiment of the present disclosure may include one or more battery modules 10 according to an embodiment of the present disclosure. In addition to the battery modules 10, the battery pack (not shown) may further include a pack case (not shown) for accommodating the battery modules 10, a current sensor, a fuse, and the like.

Meanwhile, a vehicle (not shown) according to an embodiment of the present disclosure may include the battery module 10 or the battery pack (not shown) described above, and the battery pack (not shown) may include the battery module 10.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

| Reference Signs | |
|---|---|
| 10: battery module | 100: frame |
| 110: outer frame member | 111: short-side frame member |
| 112: long-side frame member | 120: inner frame member |
| 130: space partition guide | 140: seating groove |
| 200: battery cell | 210: electrode lead |
| 300: control unit | |

What is claimed is:

1. A battery module, comprising:

a frame;

a plurality of battery cells disposed at the frame; and a control unit disposed at a center portion of the frame and electrically connected to the plurality of battery cells only via the frame, wherein the plurality of battery cells are arranged in a single layer with respect to the frame, and wherein the frame further includes a space partition guide formed at the frame to distinguish a space in which the plurality of battery cells are disposed, an upwardly protruding portion of the space partition guide being disposed directly between respective electrode leads of two adjacent battery cells among the plurality of battery cells.

2. The battery module according to claim 1, wherein the plurality of battery cells are arranged in at least one row or in at least one column.

3. The battery module according to claim 1, wherein the frame includes:

an outer frame member forming an appearance thereof; and an inner frame member disposed in an empty space of the outer frame member with a predetermined interval.

4. The battery module according to claim 3, wherein the frame is made of a conductive material.

5. The battery module according to claim 4, wherein the battery cells are respectively electrically coupled to the outer frame member and the inner frame member or respectively electrically coupled to a plurality of inner frame members.

6. The battery module according to claim 1, wherein a seating groove is formed at the frame so that electrode leads of the battery cells are coupled thereto.

7. A battery pack, comprising the battery module defined in claim 1.

8. A vehicle, comprising the battery module defined in claim 1.

* * * * *